United States Patent [19]

Yang

[11] Patent Number: 5,531,651
[45] Date of Patent: Jul. 2, 1996

[54] DIFFERENTIAL GEAR SYSTEM USING THE CHANGE IN INPUT DIRECTION TO CONTROL THE OUTPUT SPEED RATIO

[76] Inventor: Tai-Her Yang, No.32 Lane 29, Taipin St., Si-Hu Town Dzan-Hwa, Taiwan

[21] Appl. No.: 193,353

[22] Filed: Feb. 7, 1994

[51] Int. Cl.$^6$ .................. F16H 3/04; F16H 3/54
[52] U.S. Cl. .................. 475/12; 475/320; 74/810.1; 254/352
[58] Field of Search .................. 475/12, 318, 320, 475/185; 74/810.1; 254/352, 353; 477/18, 20

[56] References Cited

U.S. PATENT DOCUMENTS

| | | | |
|---|---|---|---|
| 231,949 | 9/1880 | Allen et al. | 254/353 X |
| 2,273,626 | 2/1942 | Connell | 477/18 X |
| 2,961,897 | 11/1960 | Musser | 475/185 X |
| 2,973,066 | 2/1961 | Eddy | 477/20 |

FOREIGN PATENT DOCUMENTS

| | | | |
|---|---|---|---|
| 2107825 | 4/1990 | Japan | 477/20 |
| 4321850 | 11/1992 | Japan | 475/12 |
| 242630 | 4/1969 | U.S.S.R. | 475/12 |
| 1089318 | 4/1984 | U.S.S.R. | 475/12 |
| 1289056 | 9/1972 | United Kingdom . | |
| 2109489 | 6/1983 | United Kingdom | 475/12 |

OTHER PUBLICATIONS

Smith, R. J. Circuits, Devices and Systems. N.Y., John Wiley & Sons, 1984. pp. 628–629. TK145. S616.

Primary Examiner—Charles A. Marmor
Assistant Examiner—Nathan O. Jensen
Attorney, Agent, or Firm—Bacon & Thomas

[57] ABSTRACT

A differential motion gear system that controls the output speed ratio by changing the revolving direction of the input shaft. Different embodiments produce different combinations of output direction and output speed ratio.

5 Claims, 2 Drawing Sheets

DIFFERENTIAL GEAR SYSTEM USING THE CHANGE IN INPUT DIRECTION TO CONTROL THE OUTPUT SPEED RATIO

SUMMARY OF THE INVENTION

The present invention refers to a differential motion gear system to control the speed ratio by means of the change of input direction. It causes the changing of the output speed ratio by changing the revolving direction of the input shaft of the differential motion gear system.

DETAILED DESCRIPTION OF THE INVENTION

The present invention refers to a differential motion gear system to control the speed ratio by means of changing the input direction. It causes the conversion of the output speed ratio by changing the revolving direction of the input shaft of the differential motion gear system.

Figure 1:
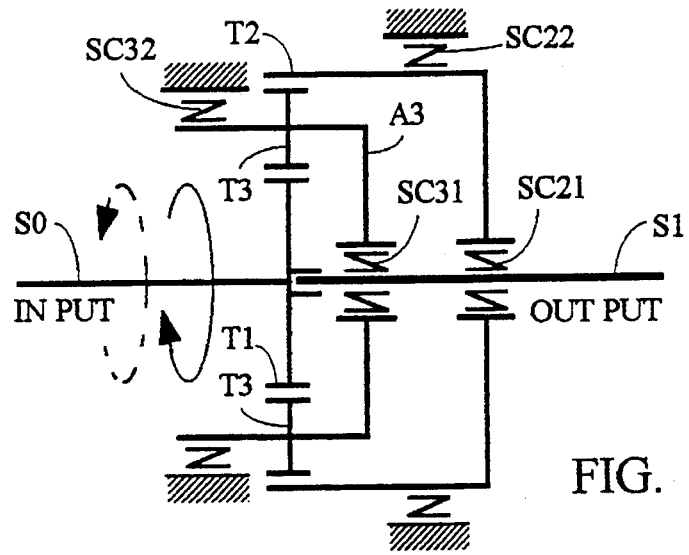
FIG. 1 is the schematic drawing of the fundamental principle of the differential motion gear system to control the speed ratio by means of changing the input direction.

FIG. 1 is the schematic drawing of the fundamental principle of the differential motion gear system to control the speed ratio by means of changing the input direction comprising:

an input sun gear T1 coupled with a differential motion gear T3 and combined with input axis or shaft SO;

the differential motion gear T3 is constituted by one or more sets of planet gears, and is coupled between the sun gear T1 and ring gear T2. The driving arm A3 drives the differential motion gear driven output shaft S1 via the one-way driving mechanism SC31 and is coupled with the stationary case via reverse one-way driving mechanism SC32;

the ring gear T2 is coupled with the differential motion gear T3; with the output shaft S1 via a one-way driving mechanism SC21; and with the stationary case via reverse one-way driving mechanism SC22;

the above one-way driving mechanisms SC21 and SC31 allow coupling with the output shaft S1 in parallel in the same direction, or with the output shaft S1 coaxially as an internal gear and an external gear. The one-way driving mechanisms SC22 and SC32 installed between the rocker arms of the ring gear and the differential motion gear and the stationary case operated in same direction and against the direction of the above mechanisms SC31 and SC32. They allow installation in parallel to or coaxially between the stationary case and the rocker arms to be driven by the ring gear and the differential gear.

Based on the above structure, taking the example of the selective design of that in the one-way driving mechanism of the ring gear, the differential motion gear and the stationary case, the former idles clockwise, and it is able to drive clockwise by coupling with the output shaft S1. The differential motion system to control the speed ratio by changing the input direction may take the form of one of the following two kinds of output:

A. While the input shaft SO revolves clockwise (CW), counterclockwise torsion of the external gear is restricted by the one-way driving mechanism SC22, the driving arm A3 of the differential motion gear T3 drives the output shaft S1 clockwise via one-way driving mechanism SC31 and the speed ratio is:

$$R=1+T2/T1$$

B. While the input axis SO revolves counterclockwise (CCW), on account of the counterclockwise torsion of the driving rocker arm A3 of the differential motion gear T3 is restricted by the one-way driving mechanism SC32. The ring gear T2 drives the output shaft S1 clockwise via the one-way driving mechanism SC21 and the speed ratio is:

$$R=-T2/T1$$

Figure 2:
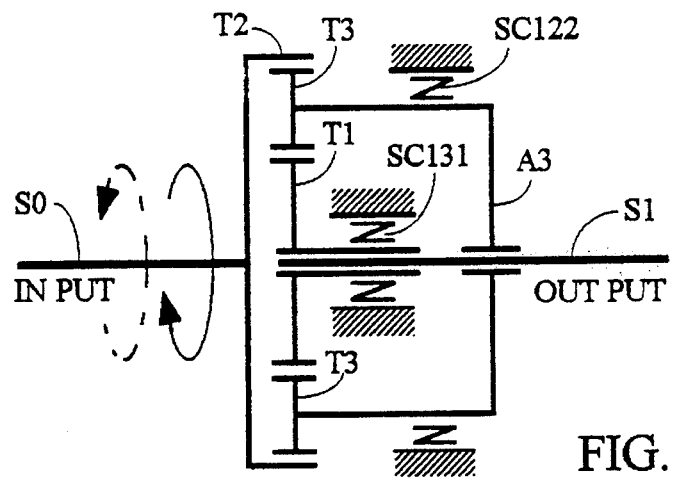
FIG. 2 is the schematic drawing of the embodiment of the differential motion gear system according to the invention to control the speed ratio by means of changing the input direction by using an external gear with the input shaft.

Based on the above fundamental principle, there are multiple practical embodiments including the use of the sun gear, the differential motion gear or the ring gear as the input. The other two gears of the above three gears will be coupled between the output shaft and the stationary case via the one-way driving mechanism based on the above-principle. For example:

As shown in FIG. 2, the embodiment using the ring gear as the input has the relationships as follows:

The ring gear T2 is connected with the input source to provide the input;

The sun gear T1 and the differential motion gear T3 mutually drive and are coupled with the output shaft S1 via the one-way driving mechanism SC131.

The driving rocker arm A3 of the differential motion gear T3 is coupled so as to rotate with the output shaft S1. A one-way driving mechanism SC122 is installed between the rocker arm A3 and the fixed case, and the acting direction is the same as that of the one-way driving mechanism SC131 of the sun gear T1 coupled with the output shaft.

The relationship of output is that on the first rotating direction, the arm A3 to be driven by the differential motion gear T3 is made stationary by the one-way driving mechanism SC122 between the differential motion gear T3 and the stationary case. The output shaft S1 is driven by the sun gear T1 via the one-way driving mechanism SC131. The output ratio will be:

$$R=-T1/T2$$

When the input shaft SO rotates reversely, the sun gear T1 is restricted by the one-way driving mechanism SC131 between itself and the fixed case. This time the output shaft S1 is driven by the driving arm A3 of the differential gear T3, and the output ratio will be:

$$R=1+T1/T2$$

Owing the reversal of the driving direction, the output will always be on the same direction in both input directions of the driving gear.

Figure 3:
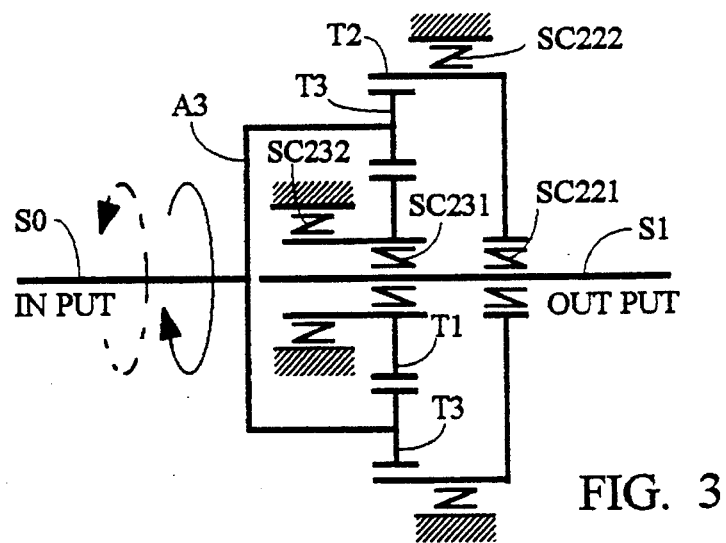
FIG. 3 is the schematic drawing of the application of the differential motion gear system according to the invention to control the speed ratio by means of changing the input direction by using a driving arm of the differential gear to drive the input shaft directly.

FIG. 3 shows an example wherein the driving arm A3 of the differential motion gear T3 is driven by the input directly. The relationships will be:

The driving rocker arm A3 of the differential motion gear T3 is coupled with the bidirectional input power source.

The sun gear set T1 and ring gear set T2 are coupled with the output shaft S1 via one-way driving mechanisms SC231 and SC221 respectfully. The one-way driving mechanisms SC232 and SC222 are installed between the sun gear T1 and ring gear T2, and the fixed case. The acting direction will be reverse to the one-way driving mechanisms SC231 and CS221 to be coupled with the output shaft.

In the output on the first rotating direction, the sun gear T1 is made stationary by the one-way driving mechanism SC232 installed between the sun gear and the fixed case. The output shaft S1 is driven by the one-way driving mechanism SC221 installed between the output shaft S1 and the ring gear T2. The output ratio will be:

$$R=1/(1+T2/T1)$$

When the input shaft SO is driven in an opposite direction, the ring gear T2 is held stationary by the one-way driving mechanism SC222 installed between the ring gear T2 and the fixed case. The output shaft S1 is driven by the one-way driving mechanism SC231 installed between the sun gear T1 and the output shaft S1. The output ratio will be:

$$R=1/(1+T1/T2)$$

Figure 4:
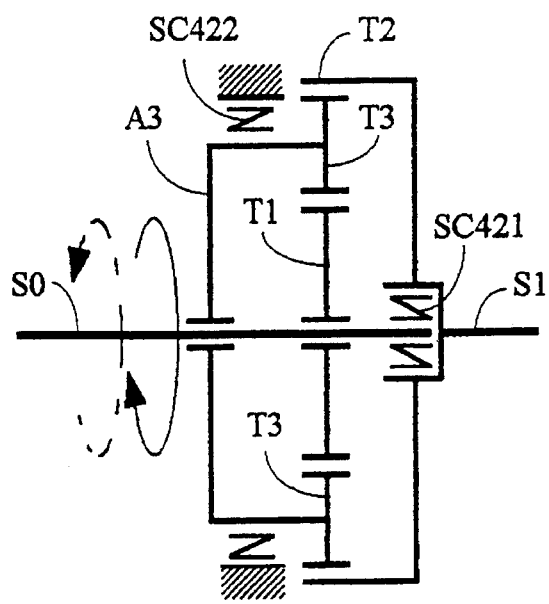
FIG. 4 is the schematic drawing of the application of the differential motion gear system according to the invention to control the speed ratio by changing the input direction in combination with an external gear with the input shaft.

FIG. 4 shows an example of an application wherein the ring gear is combined with the output shaft. The main structural relationship will be as follows.

The driving arm A3 of the differential motion gear T3 is coupled with the case via the one-way driving mechanism SC422.

The input shaft SO combines with and drives the sun gear T1 to provide a rotary motive force input, and is coupled with the ring gear T2 and the output shaft S1 via the one-way driving mechanism SC421.

The sun gear T1 is engaged with the differential motion gear T3 and combined with the input shaft SO.

In the output on the first rotating direction, the ring gear T2 and the output shaft S1 are driven by the one way driving mechanism SC421 installed between the output shaft S1 and the input shaft SO. The one-way driving mechanism SC422 installed between the rocker arm A3 of the differential motion gear T3 will idle, and the output ratio in this state will be:

$$R=1$$

When the input shaft SO rotates in an opposite direction, the one-way driving mechanism SC421 between the ring gear T2 and the input shaft SO will be idle. The one-way driving mechanism SC422 installed between the arm A3 of the differential motion gear T3 and the case will be locked up. The differential motion gear T3 will be in the output state by the ring gear T2. The output ratio at this state will be:

$$R=-T1/T2$$

The present invention provides further for an innovative quick-return differential motion gear system to switch the driving direction of the driving side and change the output speed ratio as well as the rotating direction simultaneously so that the driving axis will rotate forwardly and reversely in unequal speed ratios to improve the convenience and quick-return motion efficiency of the mechanism.

Figure 5:
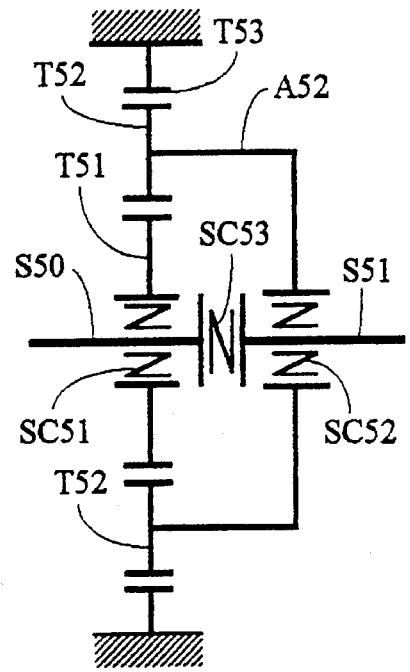
FIG. 5 is the schematic drawing of an embodiment with a series type quick-return differential motion gear system to control the speed ratio by means of changing the input direction.

The embodiment of the quick-return differential motion gear system is divided into (A) series type; (B) parallel type; and (C) double-acting type based on the distribution of the one-way driving mechanism of the structural components. It is explained based on the embodiment as follows:

(A) Series type:

FIG. 5 shows the schematic drawing of the embodiment of a series type quick-return differential motion gear system to control the speed ratio by changing the input direction. It is constituted chiefly as follows:

The shaft S50 is coupled with a reversible input rotating power to provide the quick-return differential motion gear system with a source of reversible driving force.

The sun gear T51 to be supplied with the rotating force is coupled with the input shaft S50 via a one-way driving mechanism SC51 and is engaged with the differential motion gear set T52.

The driven arm A52 is coupled with the output shaft S51 via the driving mechanism SC52 and is engaged with the ring gear T53.

The ring gear T53 is in the shape of an inner, circular gear is engaged with the differential motion gear T52 and coupled with the fixed case.

The one-way driving mechanism SC53 is installed between the input shaft S50 and the output shaft S51.

The relationship of input-direction conveying a motive force of the above-one way driving mechanism SC53 will convey a motive force in one direction, while SC51 and SC52 will provide the motive force on driving reversely.

Other structural components of the gear box relating to the case, screws, etc., are not described otherwise herein.

Figure 6:
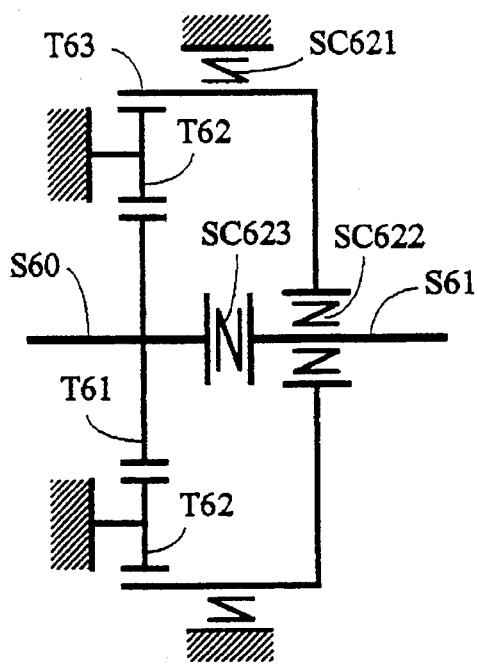
FIG. 6 is the schematic drawing of an embodiment with a parallel type quick-return differential motion gear system to control the speed ratio by means of changing the input direction.

(B) Parallel type:

The parallel type quick-return gear system to control speed ratio by changing the input direction is shown in the schematic drawing in FIG. 6. The main structure includes:

The input shaft is coupled with the quick-return differential motion gear system to input forward and reverse rotating forces.

The sun gear T61 is connected to the input shaft S60 and coupled to the differential motion gear T62.

The differential motion gear T62 is coupled with the sun gear T61 and the ring gear T63, and is fixed on the case;

the ring gear T63 is coupled with the differential motion gear T62 and drives the output shaft S61 by means of the conveying of motive force of the one-way driving mechanism SC622. It is coupled with the case by means of another one-way driving mechanism SC621 to rotate or remain stationary in different thrust directions.

The one-way driving mechanism SC623 is installed between the input shaft S60 and output shaft S61.

The relationship of the acting-direction of the above one-way driving mechanism SC623 to convey motive force is that in a first driving direction, SC621 allows the ring gear T63 to rotate freely, SC622 causes the output shaft S61 to rotate, and SC623 allows idle rotation between the input shaft S60 and the output shaft S61. In the second driving direction, SC621 causes the ring gear T63 to be stationary, SC623 causes the input shaft S60 to be connected with the output shaft S61, and SC622 allows idle rotation between the output shaft S61 and the ring gear T63.

Other related structural components of the accustomed gear box of the case, screw, etc., are not described herein otherwise.

Figure 7:
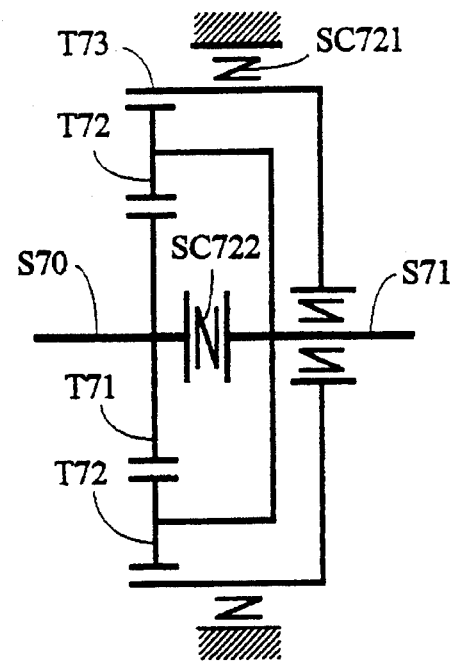
FIG. 7 is the schematic drawing of an embodiment with a double-acting type quick-return differential motion gear system to control the speed ratio by means of changing the input direction.

(C) Double-acting type:

The embodiment of the double-acting type quick-return differential motion gear system to control the speed ratio by changing the input direction is shown in the schematic drawing in FIG. 7 and is constituted chiefly by:

The input shaft S70 is coupled with the quick-return differential motion gear system for the input of opposite rotary motive forces and coupled with the output shaft S71 via the one-way driving mechanism SC722.

The sun gear T71 is connected to the input shaft S70 and coupled with the differential motion gear T72.

The differential motion gear 72 is coupled with the sun gear T71 and the ring gear T73. The spindles of the various differential motions gears are installed on the driving arm jointly to drive the output shaft S71, which is also coupled to the input shaft S70 via the one-way driving mechanism SC722.

Ring gear T73 is coupled with the differential motion gear T72 and then coupled with the fixed case via the one-way driving mechanism SC721 to rotate or remain stationary in different directions.

The one-way driving mechanism SC722 is installed between the input shaft S70 and the output shaft S71.

The relationship of the acting-direction to convey motive force of the above one-way driving mechanism is that SC721 allows the ring gear T73 to rotate freely in a first driving direction, while SC722 causes the conveying of motive force between the input shaft S70 and the output shaft S71. SC721 causes the external gear to be stationary in the second driving direction. SC722 allows the input shaft S70 and the output shaft 571 to rotate idly. By this time the output shaft S71 is driven by the differential motion gear T72 and the driving arm to perform a reduction output.

Other related structural components of the gear box, and screws are not described herein otherwise.

The differential motion gear system to control speed ratio by changing the input direction can be combined further with an automatic load sensor to control the opposite rotating of the driving source of the driving axle to change the output speed ratio.

Excepting artificial switching of the rotating direction of the source of the rotating motive force, it allows to detect further the load current of the source of the motive force for reference of the time to change the direction. It is generally used to detect the load current of the motor to change the direction of the rotation of the motor. When the load current exceeds the setting conditions, the differential motion gear system will control the speed ratio by changing the input direction from one direction into an opposite direction. It may change from a smaller speed ratio, or further entail simultaneous conversion of the output direction. In addition, the detecting method also may use a mechanical torsion sensor as the basis of control and detecting. If the driving side has the load of other motive forces, such as an engine, the direction converting mechanism may be driven on overloading by combining it with a torsion sensor or a restricting device to change the rotating direction of the input of the differential motion gear system.

In practical applications, the following options are available:

To combine a conventional reciprocal mechanism on the input or output end will be able to obtain the variable output with bidirectional invariable speed ratio.

In summary, the innovative differential motion gear system to control the speed ratio by changing the input direction shows the output in same output direction with different speed ratios, or the output in a different direction with different speed ratio to be produced by the opposite driving of a differential motion gear system at the side of driving force. It may be applied for various driving with the one kind of the structure of multiple sets of series stages or the mixed stages.

I claim:

1. I claim a differential motion gear system to control a speed ratio by changing the input direction comprising:
   a) an input shaft rotatable in opposite directions;
   b) an output shaft;
   c) a first one way drive mechanism connected between the input shaft and the output shaft;
   d) a sun gear connected to the input shaft;
   e) a differential motion gear engaged with the sun gear;
   f) a ring gear engaged with the differential motion gear;
   g) a stationary case; and,
   h) means attaching the ring gear to the stationary case so as to prevent relative rotation between the ring gear and the stationary case, wherein the means attaching the ring gear to the stationary case fixedly attaches the ring gear to the stationary case so as to prevent any relative rotation of the ring gear relative to the stationary case.

2. The differential motion gear system of claim 1 further comprising;
   a) a second one way drive mechanism connected between the sun gear and the input shaft; and,
   b) a third one way drive mechanism connected between the differential motion gear and the output shaft.

3. I claim a differential motion gear system to control a speed ratio by changing the input direction comprising:
   a) an input shaft rotatable in opposite directions;
   b) an output shaft;
   c) a first one way drive mechanism connected between the input shaft and the output shaft;
   d) a sun gear connected to the input shaft;
   e) a differential motion gear engaged with the sun gear;
   f) a ring gear engaged with the differential motion gear;
   g) a stationary case;
   h) means attaching the ring gear to the stationary case comprising a second one way drive mechanism connected between the ring gear and the stationary case; and
   i) a third one way drive mechanism connected between the ring gear and the output shaft.

4. The differential motion gear system of claim 3 further comprising connecting means to fixedly connect the differential motion gear to the stationary case.

5. The differential motion gear system of claim 3 further comprising connecting means to fixedly connect the differential motion gear to the output shaft.

* * * * *